US007423387B2

(12) United States Patent
Robinson et al.

(10) Patent No.: US 7,423,387 B2
(45) Date of Patent: Sep. 9, 2008

(54) APPARATUS AND METHOD FOR CONTROLLING COLOUR AND COLOUR TEMPERATURE OF LIGHT GENERATED BY A DIGITALLY CONTROLLED LUMINAIRE

(75) Inventors: Shane Robinson, Vancouver (CA); Paul Jungwirth, Burnaby (CA)

(73) Assignee: TIR Technology LP, Burnaby, BC (CA)

( * ) Notice: Subject to any disclaimer, the term of this patent is extended or adjusted under 35 U.S.C. 154(b) by 364 days.

(21) Appl. No.: 11/285,980

(22) Filed: Nov. 23, 2005

(65) Prior Publication Data

US 2006/0109219 A1 May 25, 2006

Related U.S. Application Data

(60) Provisional application No. 60/630,731, filed on Nov. 23, 2004.

(51) Int. Cl.
*B60Q 1/00* (2006.01)

(52) U.S. Cl. ................ 315/291; 315/169.3; 315/185 R; 315/192; 315/193

(58) Field of Classification Search ................. 315/291, 315/169.3, 149–159, 312, 193, 192, 185 R; 235/454, 455
See application file for complete search history.

(56) References Cited

U.S. PATENT DOCUMENTS

| | | | | |
|---|---|---|---|---|
| 36,418 | A | 9/1862 | Maynard | |
| 5,459,328 | A | 10/1995 | Kadota et al. | |
| 6,194,839 | B1 | 2/2001 | Chang | |
| 6,201,353 | B1 | 3/2001 | Chang et al. | |
| 6,411,046 | B1 | 6/2002 | Muthu | |
| 6,495,964 | B1 | 12/2002 | Muthu et al. | |
| 2002/0048177 | A1 | 4/2002 | Rahm et al. | |
| 2002/0145041 | A1 * | 10/2002 | Muthu et al. | 235/454 |
| 2003/0107887 | A1 | 6/2003 | Eberl | |
| 2003/0227281 | A1 * | 12/2003 | Nguyen | 323/282 |
| 2004/0036418 | A1 | 2/2004 | Rooke et al. | |

FOREIGN PATENT DOCUMENTS

| | | |
|---|---|---|
| EP | 1 615 195 | 1/2006 |
| JP | 05-067810 | 3/1993 |
| JP | 2003/215674 | 7/2003 |
| WO | WO 02/47438 | 6/2002 |
| WO | WO 03/024269 | 3/2003 |
| WO | WO 2004/093040 | 10/2004 |

* cited by examiner

*Primary Examiner*—David H Vu
(74) *Attorney, Agent, or Firm*—King & Spalding LLP

(57) ABSTRACT

The present invention provides a method and apparatus for controlling the correlated colour temperature (CCT) or colour of light produced by an array of light-emitting elements by providing multiple selectable paths for the flow of drive current. The apparatus includes a primary path comprising primary light-emitting elements, and one or more secondary paths comprising secondary light-emitting elements that are used for compensation or correction of the colour of light emitted by the primary light-emitting elements. A plurality of control means, for example switches are used to direct current through particular paths. During operation, the drive current primarily flows through the primary light-emitting elements and is redirected, periodically for example, to a secondary path comprising light-emitting elements of a particular colour that is desired in addition to the colour produced by the primary light-emitting elements.

19 Claims, 9 Drawing Sheets

APPARATUS AND METHOD FOR CONTROLLING COLOUR AND COLOUR TEMPERATURE OF LIGHT GENERATED BY A DIGITALLY CONTROLLED LUMINAIRE

CROSS REFERENCE TO RELATED APPLICATIONS

This application claims the benefit of priority to U.S. Provisional Application No. 60/630,731, filed Nov. 23, 2004.

FIELD OF THE INVENTION

The present invention pertains to the field of lighting and more specifically to a system and method for control of the colour or colour temperature of light emitted from an array of light-emitting elements such as light-emitting diodes (LEDs).

BACKGROUND

Recent advances in the development of semiconductor and organic light-emitting diodes (LEDs and OLEDs) have made these solid-state devices suitable for use in general illumination applications, including architectural, entertainment, and roadway lighting, for example. As such, these devices are becoming increasingly competitive with light sources such as incandescent, fluorescent, and high-intensity discharge lamps.

A property used to characterize a light source is the correlated colour temperature (CCT) and there are a number of methods of controlling the CCT of an LED light source. For example, U.S. Pat. No. 6,411,046 discloses the calculation of colour temperature of light emitted by a luminaire with an array of multicoloured LEDs with at least one LED in each of a plurality of colours. The colour temperature is calculated based on ambient temperatures and preset values, and each set of coloured LEDs is driven to produce a desired colour temperature. U.S. Pat. No. 6,495,964 describes a method for controlling the colour temperature of white light through optical feedback. Measured light outputs are compared to desired outputs and each LED colour is driven accordingly to reach the desired output. This drive method illustrated in FIG. 1, includes a DC-to-DC fly-back converter along with a filtering capacitor and inductor. This configuration can be an efficient drive method, however it involves a large number of parts per LED.

U.S. Patent Application No. 2004/0036418 also discloses a drive method where a DC-to-DC converter is used to vary the current through several LED paths. A current switch and sensor is implemented to provide feedback and control to limit the current to defined levels as illustrated in FIG. 2. This method can be considered to be similar to a standard buck converter and provides an efficient way for controlling the current through a given LED string. This drive method however, does not provide effective drive control when multiple LED paths are employed to facilitate colour control. When two LED paths with different forward voltages are used, high side switches are used as current limiting devices. The function of current limiting using transistors as variable resistors can result in large losses which decreases the overall efficiency of the circuit.

In addition, shunting techniques can be used to provide variable current flow through the LEDs. For example, if the forward voltage across an LED within a string of LEDs changes, then the total forward voltage across the string will change by the forward voltage across that specific LED. Switching in this manner requires large inductors to smooth the large changes in forward voltage and current flow. In the absence of large inductors, power losses of significant magnitude will occur in the supply or in the drive circuitry. Drive methods that require large components due to heavy switching, which induces large power losses on the supply or drive circuitry, further do not lend themselves to miniaturization due to the size of these components.

In addition, light sources that use a phosphor coating to produce visible light are typically very sensitive to changes in their junction temperature. Changes in this junction temperature can cause shifts in the center wavelength of blue light, for example. Unfortunately, the excitation spectra of phosphors is typically configured such that the peak excitation wavelengths do not coincide with the center wavelength emitted by the LED, and therefore only minor shifts in the LED emission spectra can cause significant changes in the conversion efficiency of the phosphors. This configuration can produce significant changes in the CCT of the phosphor coated LEDs as they are dimmed or as the ambient temperature changes. These devices thus require additional methods of controlling their CCT. For example, International Patent Application Publication No. WO 03/024269 discloses a method of using amber LEDs in combination with "warm white" (low CCT) and "cool white" (high CCT) phosphor-coated LEDs to dynamically change the CCT of the white light they generate. This method however is limited to adjusting the colour temperature of phosphor coated white LEDs.

Furthermore, as an LED's junction temperature increases the relative luminous flux decreases as illustrated in FIG. 3 (Luxeon™ Emitter Technical Data Sheet DS25). If LEDs are driven at their rated power and the light output of a specific colour in the spectrum decreases, that colour of LED may have to be driven harder to compensate for this decrease. The increased current results in more heat, which may lead to an avalanche effect and permanent damage to the LEDs.

Therefore, there is a need for an apparatus and method of controlling the colour and colour temperature of light produced by a digitally controlled light source without significant power losses as well as circuits that have a small part count that can further enhance the efficiency of the circuit while maintaining a low overall system cost.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide an apparatus and method for controlling colour and colour temperature of light generated by a digitally controlled luminaire. In accordance with an aspect of the present invention, there is provided an apparatus for controlling colour temperature or colour of light emitted from an array of light-emitting elements, said apparatus comprising: a power source operatively coupled to primary light-emitting elements and one or more secondary light-emitting elements, the power source for providing current thereto, said primary light-emitting elements emitting light of a particular colour when activated and each of the one or more secondary light-emitting elements emitting light of another colour when activated; a primary path for the current to selectively flow, said primary path including the primary light-emitting elements; one or more secondary paths for the current to selectively flow, each of said one or more secondary paths including one or more secondary light-emitting elements; and a plurality of control means, wherein one or more control means is operatively positioned between the power source and each of the primary path and the one or more secondary paths, the control means for directing the current through one or more of the primary path and the one or more secondary paths; wherein emitted light is mixed to generate a desired colour temperature or colour of light.

In accordance with another aspect of the invention, there is provided a method for controlling the colour temperature or colour of light emitted from an array of light-emitting elements, said method comprising the steps of: generating a current for activation of one or more of primary light-emitting elements and one or more secondary light-emitting elements, the primary light-emitting elements emitting light of a particular colour when activated and each of the one or more secondary light-emitting elements emitting light of another particular colour when activated; selectively directing the current through a primary path or one or more secondary paths using a plurality of control means thereby selectively activating one or more primary light-emitting elements and/or secondary light-emitting elements, said primary path including primary light-emitting elements, and each of the one or more secondary paths including one or more secondary light-emitting elements; and mixing the light to generate a desired colour temperature or colour of light.

DETAILED DESCRIPTION OF THE INVENTION

Definitions

Figure 1:
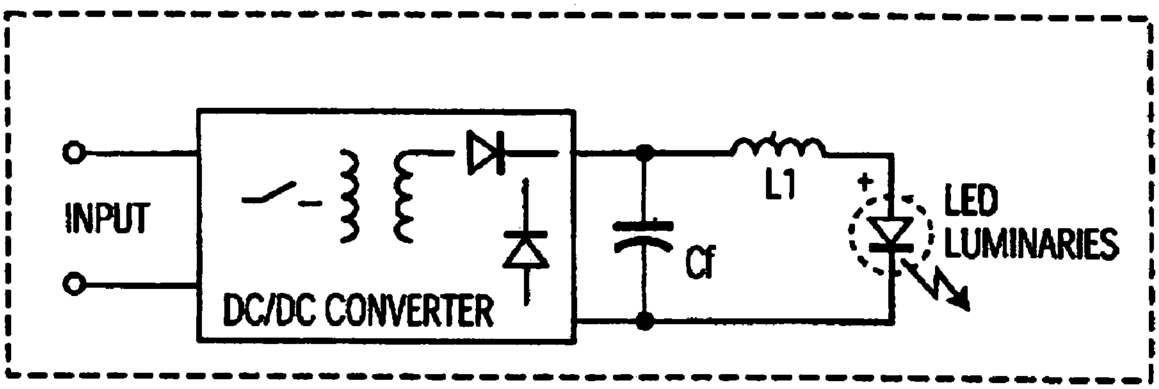
Figure 1 (Prior Art)
FIG. 1 illustrates an LED drive method according to the prior art.
Figure 2:
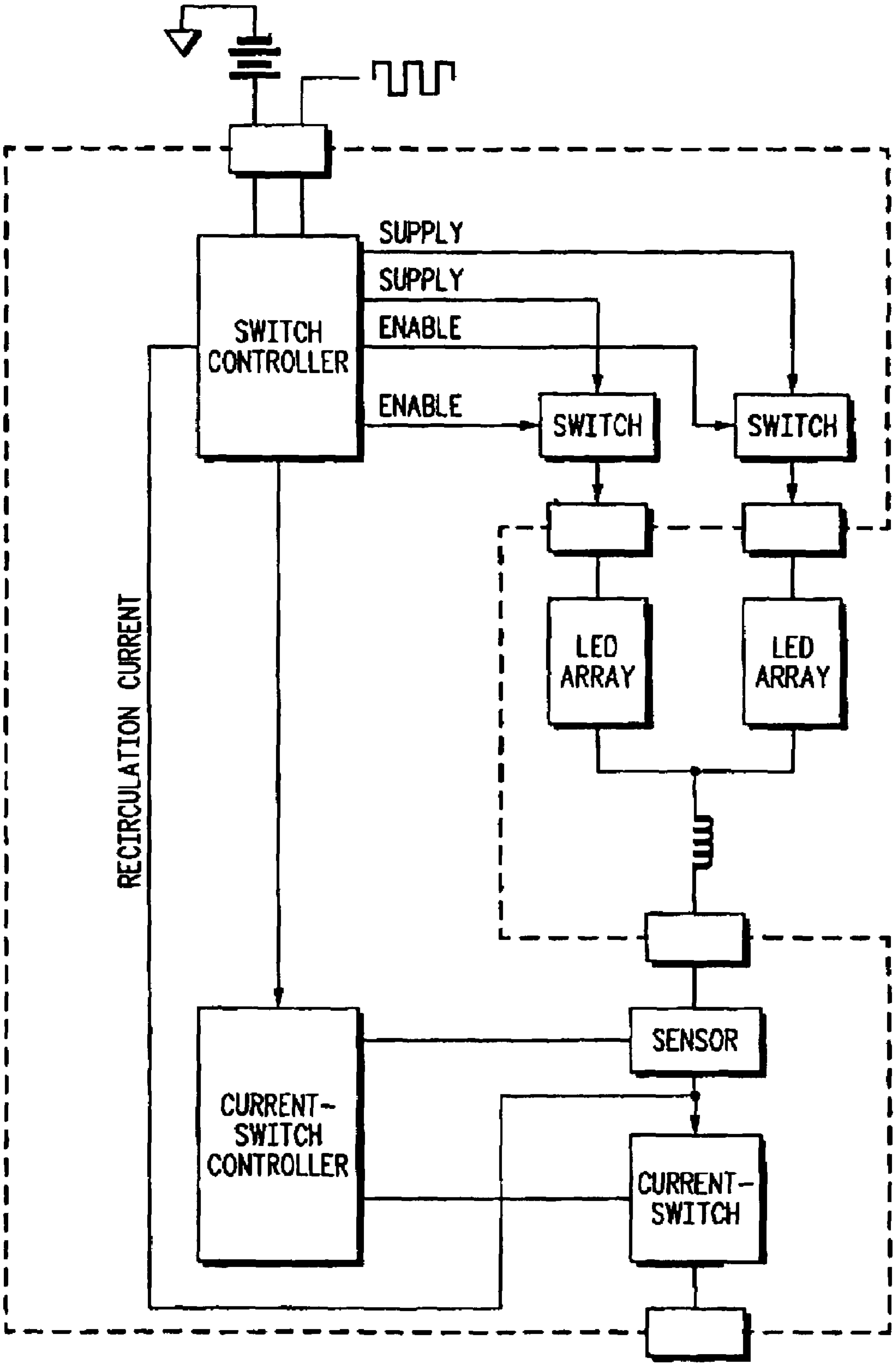
Figure 2 (Prior Art)
FIG. 2 illustrates another LED drive method according to the prior art.
Figure 3:
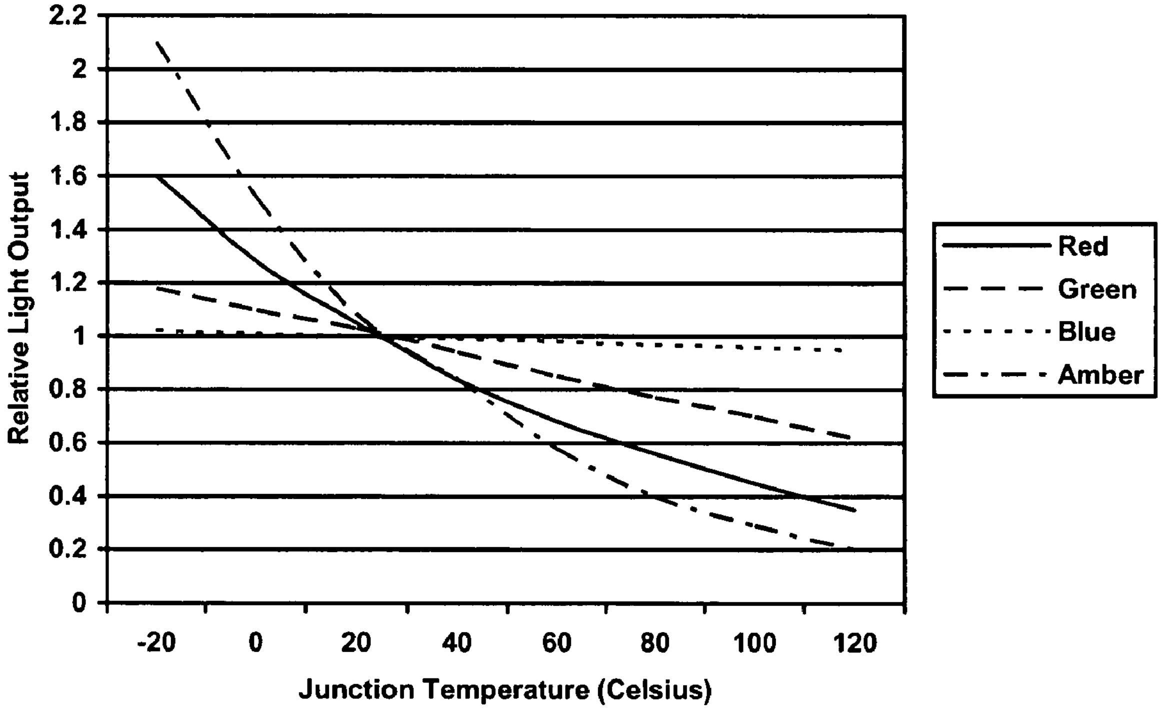
Figure 3 (Prior Art)
FIG. 3 illustrates the relationship between temperature and relative light output according to the prior art.

The term “light-emitting element” is used to define any device that emits radiation in any region or combination of regions of the electromagnetic spectrum for example the visible region, infrared and/or ultraviolet region, when activated by applying a potential difference across it or passing a current through it, for example. Examples of light-emitting elements include semiconductor, organic, polymer, phosphor coated light-emitting diodes (LEDs) and other similar devices as would be readily understood.

The term “power source” is used to define a means for providing power to an electronic device, for example a light-emitting element and may include various types of power supplies and/or driving circuitry.

As used herein, the term “about” refers to a +/−10% variation from the nominal value. It is to be understood that such a variation is always included in any given value provided herein, whether or not it is specifically identified.

Unless defined otherwise, all technical and scientific terms used herein have the same meaning as commonly understood by one of ordinary skill in the art to which this invention belongs.

The present invention provides a method and apparatus for controlling the correlated colour temperature (CCT) or colour of light produced by an array of light-emitting elements by providing multiple selectable paths for the flow of drive current. The apparatus includes a primary path comprising primary light-emitting elements, and one or more secondary paths comprising secondary light-emitting elements that are used for compensation or correction of the colour of light emitted by the primary light-emitting elements. A plurality of control means, for example switches are used to direct current through particular paths. During operation, the drive current primarily flows through the primary light-emitting elements and is redirected, periodically for example, to a secondary path comprising light-emitting elements of a particular colour that is desired in addition to the colour produced by the primary light-emitting elements. The rate at which the current is switched between the two or more paths is provided in such a manner that the overall effect obtained is the addition of the colour of light produced by the primary light-emitting elements and the colour of light produced by the particular secondary light-emitting elements. This can result in a different overall CCT or colour of light when compared to the CCT or colour of light produced by the primary light-emitting elements only. Additional colours can similarly be effectively added to the colour of the primary light-emitting elements.

In one embodiment, when perceived flicker by a human observer is not desired, the switching rate at which the path of the current is changed can typically be greater than about 60 Hz and in one embodiment greater than about 100 Hz. Under these conditions, a human observer will typically be unable to perceive any illumination flicker due to colour adjustment for example.

The present invention can provide colour correction to light emitted by light-emitting elements by effectively adding light from light-emitting elements of other colours, while keeping the amount of current drawn from the power supply essentially constant. Thus, various colour temperatures or colours of light from an array of light-emitting elements can be achieved without a substantial change in supply voltage or current as is commonly associated with switching style voltage converters which are commonly used in the art.

Figure 4:
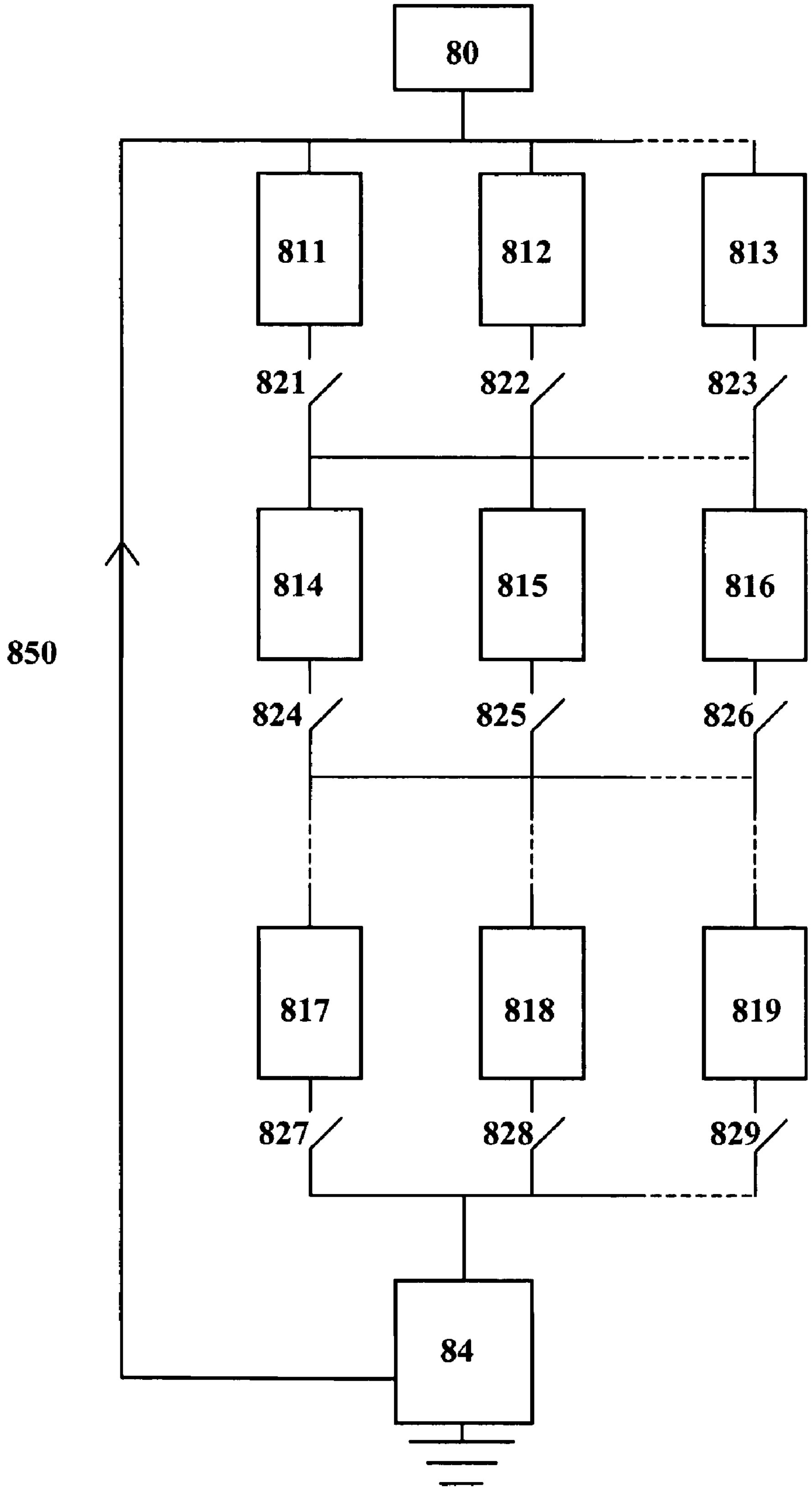
FIG. 4 illustrates a generalized circuit configuration comprising generalized light-emitting element units according to one embodiment of the present invention.

FIG. 4 illustrates an apparatus for controlling colour temperature or light colour according to one embodiment of the present invention apparatus. Each of light-emitting element units 811 to 819 comprises a plurality of light-emitting elements in a series and/or parallel configuration. Typically, one path comprises the light-emitting elements to be controlled and forms the primary path, with the remaining light-emitting element units forming parts of alternate secondary paths, through which current can be directed for CCT or light colour correction. Control means 821 to 829 determine which path current from the power source 80 flows. Any number of desired colours of light-emitting elements may be present as well as any number of nodes, each node having associated therewith a control means for determining the path of current flow. The apparatus further comprises current control circuitry 84 for controlling the activation of the light-emitting elements.

Figure 5:
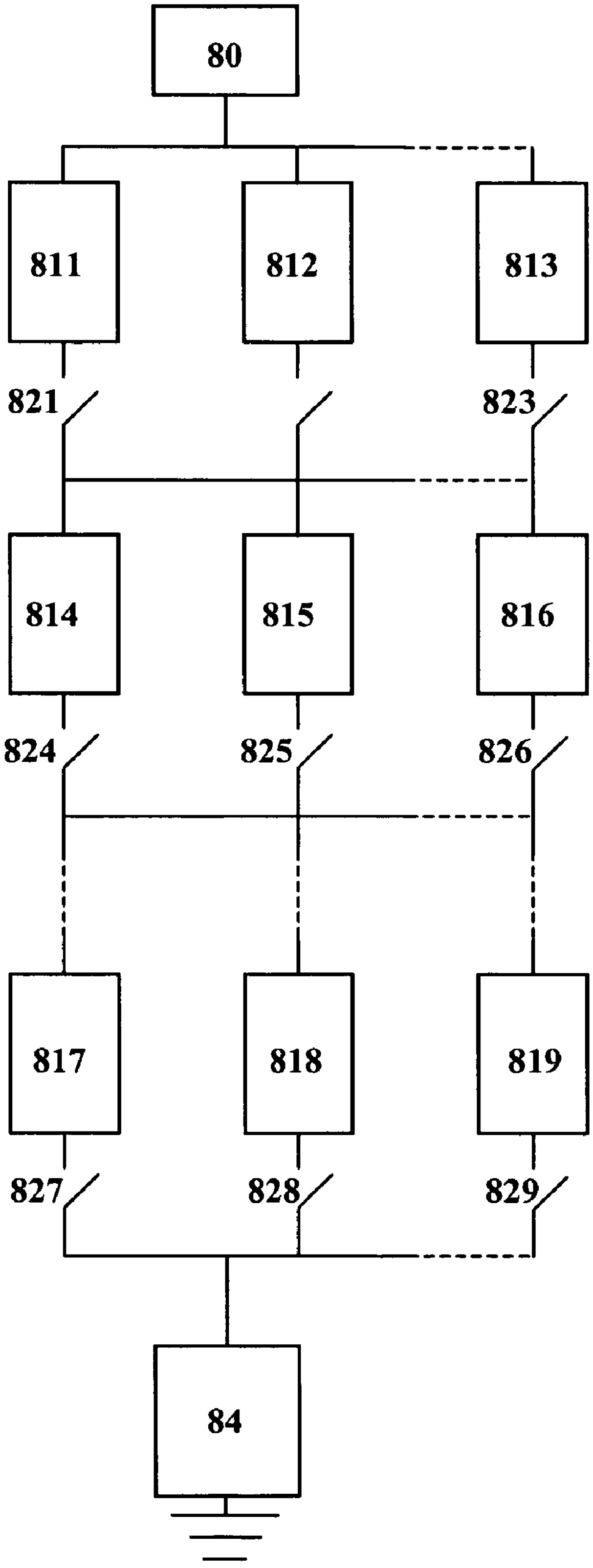
FIG. 5 illustrates another generalized circuit configuration according to another embodiment of the present invention.

In one embodiment as illustrated in FIG. 4, the apparatus further comprises a smoothing mechanism partially or fully integrated with the current control circuitry 84. The smoothing mechanism can optionally include a recirculating mechanism 850 which can provide a return path between the low side and the high side of the light-emitting elements. The smoothing mechanism can provide a means for smoothing out switching transients during current path transitions. The smoothing mechanism can be an inductor, an inductor and a resistor, an inductor and a free-wheeling diode, an inductor and a resistor and a free-wheeling diode, or other smoothing mechanism as would be known to a worker skilled in the art. FIG. 5 illustrates another embodiment of the apparatus illustrated in FIG. 4, without a return path between the low side and high side of the light-emitting elements.

In one embodiment, during typical operation, the total current through the system is limited to the rating for one string of light-emitting elements and when light-emitting elements in the primary path are activated, the light-emitting elements in the secondary paths are deactivated, and when elements in the primary path are deactivated, light-emitting elements in one of the alternate paths are activated. The duty cycle of all the paths therefore totals about 100%.

In one embodiment, the drive current is directed through a single path at any given time, however, the current may also be directed through more than one path simultaneously if desired. For example and with reference to FIG. 4, the appropriate activation of control means 821 to 829 can provide a desired single or multi-path configuration.

The generation of digital control signals for controlling the light-emitting elements can be performed using Pulsed Width Modulation (PWM), Pulsed Code Modulation (PCM) or any other digital control method as would be readily understood by a worker skilled in the art. In one embodiment of the present invention, analog control signals could be used as an alternate means for control of the light-emitting elements, however this format of control may reduce overall efficiency when compared with digital control.

Each of the control means can be designed as any one of a switch, transistor or other device which provides a means for controlling passage of current along a particular path. For example a control means can be a FET switch, BJT switch, relay or any other form of controllable switch as would be readily understood by a worker skilled in the art.

Figure 6:
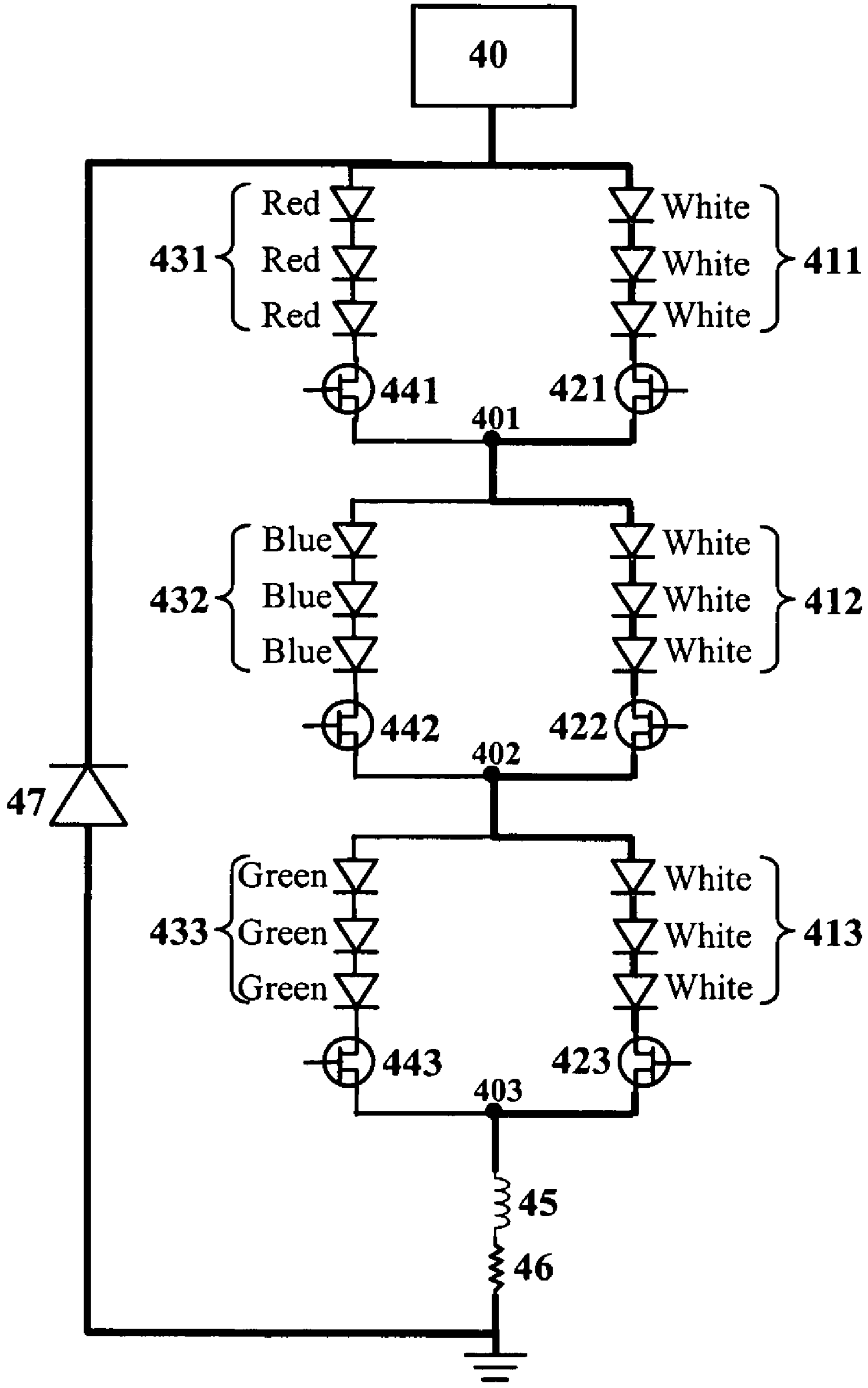
FIG. 6 illustrates a series-parallel circuit configuration comprising white LEDs, and coloured LEDs for colour compensation, according to one embodiment of the present invention.

FIG. 6 illustrates one embodiment of the present invention in which a power source 40 powers LED strings, 411 to 413, and 431 to 433. During typical operation, most of the drive current flows through the primary path (illustrated with a thick line in FIG. 6) comprising white LED strings 411 to 413, with a small amount of drive current directed through LED strings 431, 432 and/or 433, as needed for colour correction. The LEDs are arranged in a series-parallel configuration with transistor control at each of nodes 401, 402 and 403. The current flowing through the primary path comprising LED strings 411, 412 and 413 is controlled by transistors 421, 422 and 423, respectively. LED strings 431 to 433 form parts of alternate secondary paths and transistors 441, 442 and 443 control the current flow through red LED string 431, blue LED string 432 and green LED string 433, respectively. Depending on which transistors are turned ON and which transistors are turned OFF, the drive current through the LEDs can flow through various paths. For example, when transistors 441 to 443 are OFF, all the current flows through the primary path comprising white LED strings 411 to 413.

In one embodiment, transistor pair 421 and 441 may be operated such that they are complementary to each other, that is, when one transistor is ON the other transistor is OFF, and vice versa. Thus, transistors 421 and 441 can be switched with complementary duty cycles, where one transistor is switched with a duty cycle of D, and the other transistor is switched with a duty cycle of (1-D). The current flowing through each path will be directly proportional to the particular duty cycle associated with that path. For example, according to the embodiment illustrated in FIG. 6, when a greater component of red is desired in the overall light emitted from the LEDs in this embodiment, portions of the drive current may be redirected through red LEDs 431 to achieve the desired effect by turning transistor 441 ON and turning transistor 421 OFF, while transistor 442 and 443 are kept OFF and transistor 422 and 423 are kept ON. In this embodiment, transistor pairs 422 and 442, and 423 and 443, can be similarly operated such that components of blue light and green light, respectively, may be varied in the total CCT of the emitted light of the LEDs. Therefore, different overall CCTs and colour correction can be achieved by shifting the current away from any of white LED strings 411 to 413 to any of the three LED strings, 431, 432 or 433.

In another embodiment, transistor pairs 421 and 441, 422 and 442, and 423 and 443 may also be turned ON simultaneously if desired to achieve various overall CCTs or colours of light. This configuration however, would lead to the current flowing through multiple paths simultaneously and being shared between these paths, as would be readily understood.

In one embodiment, the switching transients can be relatively low and are related to the forward voltage difference in each LED string. An inductor 45 and resistor 46 may be in the circuit along with a free-wheeling diode 47 to smooth the current being drawn from the power source if required. The resistor can be of a low value, and need only be large enough to allow accurate current sensing for the drive circuitry or power source. The size of the inductance required can be much smaller than that required for alternate methods as is seen in the current state of the art, therefore making the physical size of the inductor used in the present invention relatively small.

In the embodiment illustrated in FIG. 6, the current draw on the power source can be low at rated current, and the voltage requirements can be approximately nine times the forward voltage drop of each LED. Other embodiments with a different total number of light emitting elements may also be possible. In addition, the number of light emitting elements in the secondary path need not necessarily be the same as the number of light emitting elements in the primary path, however may be desirable to ensure that the voltage drop of each parallel path is approximately the same, in order to reduce step changes in the load as seen by the power source when switching between the primary path and one or more of the secondary paths.

Figure 7:
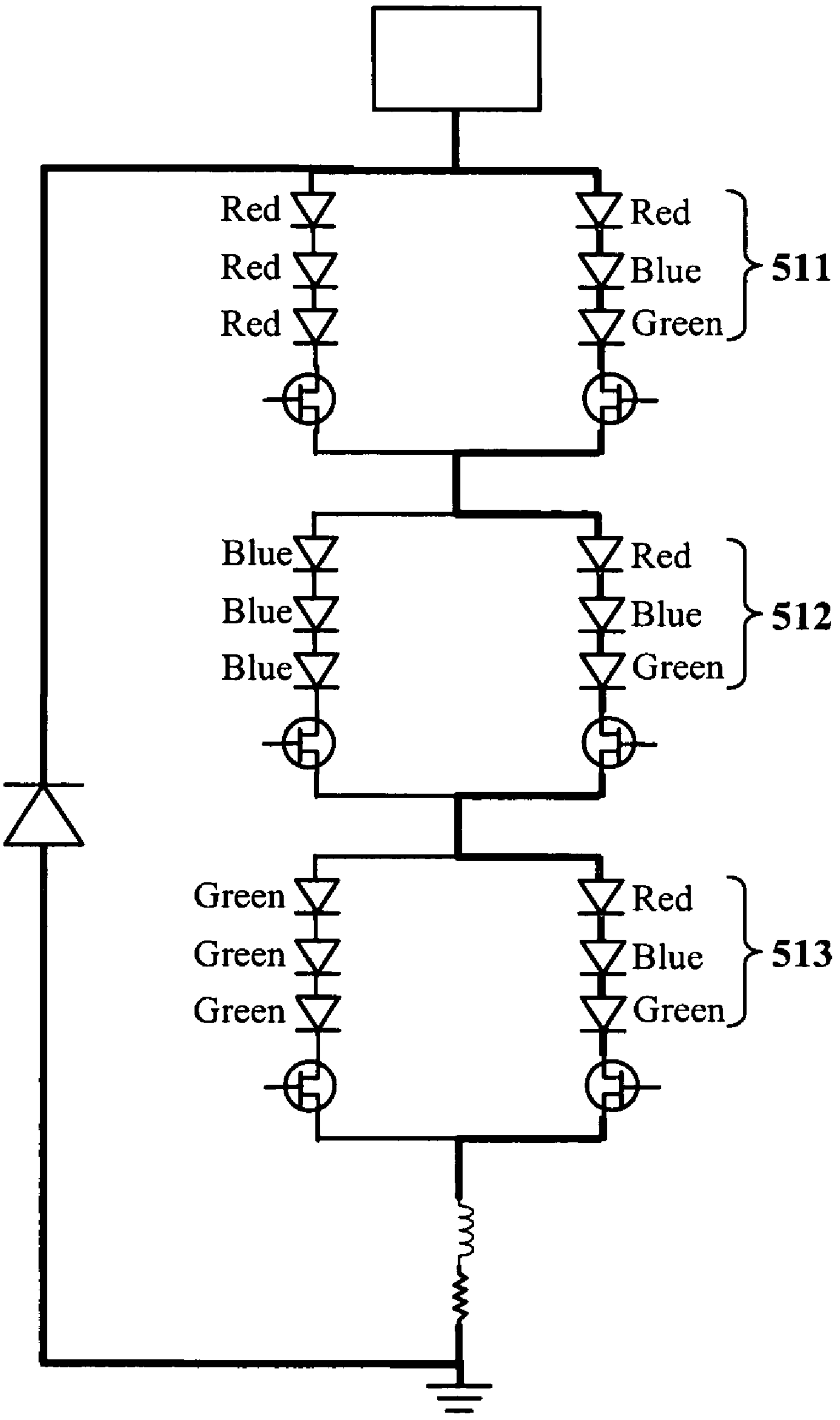
FIG. 7 illustrates a series-parallel circuit configuration comprising RGB LEDs for generating white light, and coloured LEDs for colour compensation, according to one embodiment of the present invention.

FIG. 7 illustrates another embodiment of the present invention. This embodiment is similar to the embodiment of FIG. 6, however white LED strings 411 to 413 are replaced with LED strings 511 to 513, respectively. Each LED string 511 to 513 comprises a red LED, blue LED and green LED. With sufficient light mixing, the RGB light output from the LED strings 511 to 513 can combine to effectively emit white light. Thus, this configuration can provide the same overall effect as the embodiment of FIG. 6, without the disadvantages which may be associated with present state-of-the-art white LEDs.

Figure 8:
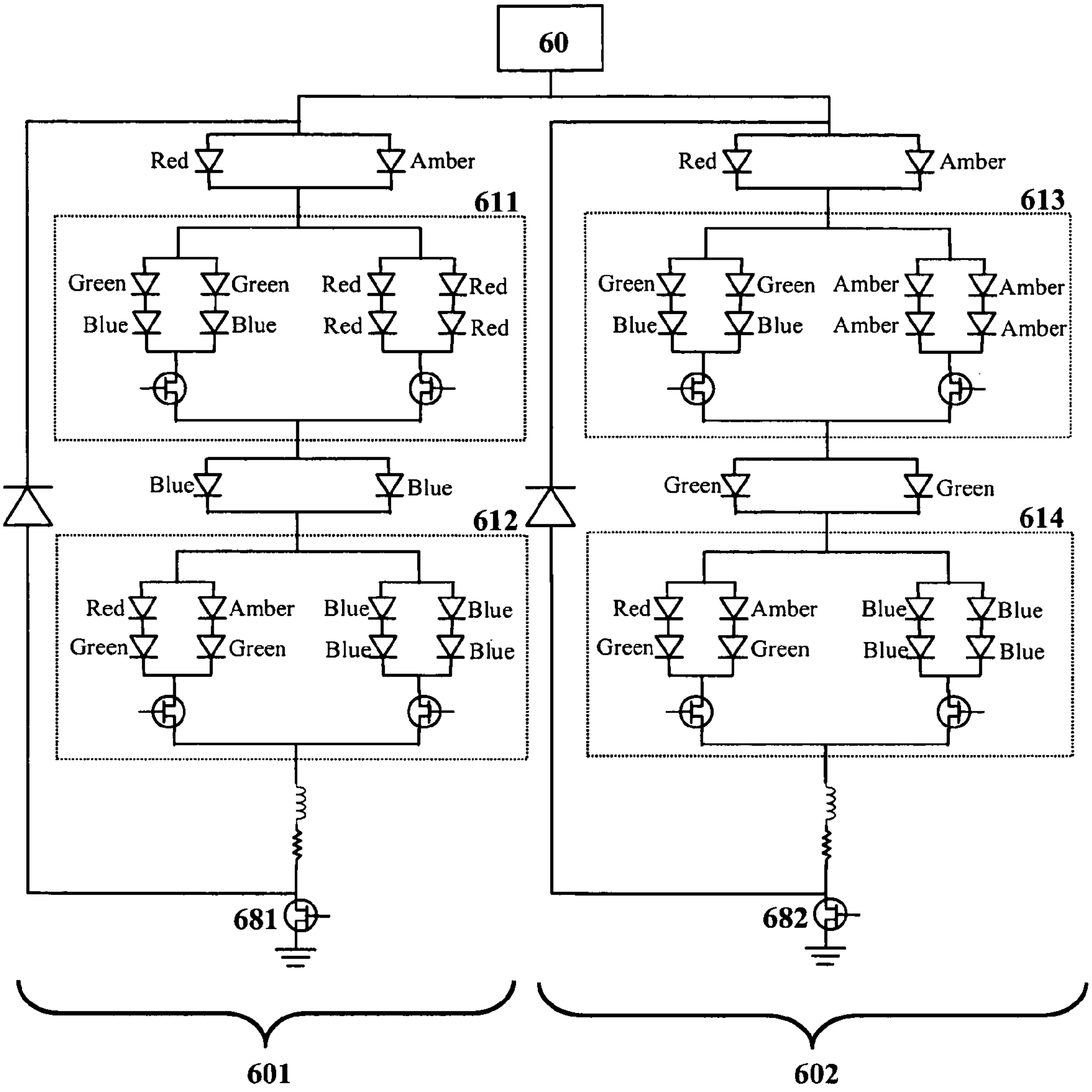
FIG. 8 illustrates a series-parallel circuit configuration comprising RGBA LEDs for generating white light, and coloured LEDs for colour compensation, according to one embodiment of the present invention.

FIG. 8 illustrates another embodiment of the present invention in which four colours, RGB and amber LEDs (RGBA) are used to produce white light. The addition of amber LEDs to the RGB LEDs can increase the range of CCT values on the black body locus, or can increase the range of colours achievable. In addition, amber LEDs in combination with RGB LEDs can provide a better colour balance and colour rendering compared to RGB LEDs alone.

In one embodiment, the addition of a string of amber LEDs to the embodiments of FIG. 6 or FIG. 7 can result in relatively large voltage requirements. Therefore, a series-parallel configuration comprising four current splitters 611 to 614 as illustrated in FIG. 8 may be advantageous, since a lower total forward voltage can be achieved, while achieving a wide range of CCTs or colours. The total current draw from the power source 60 can be approximately four times the rated current and the total forward voltage can be approximately six times the voltage drop across each LED.

In one embodiment as illustrated in FIG. 8, transistors 681 and 682 can be used to receive control signals for the LEDs in branch 601 and 602, respectively. The control signal may be any signal such as a PWM signal, PCM signal, or any other signal as would be readily understood.

Figure 9:
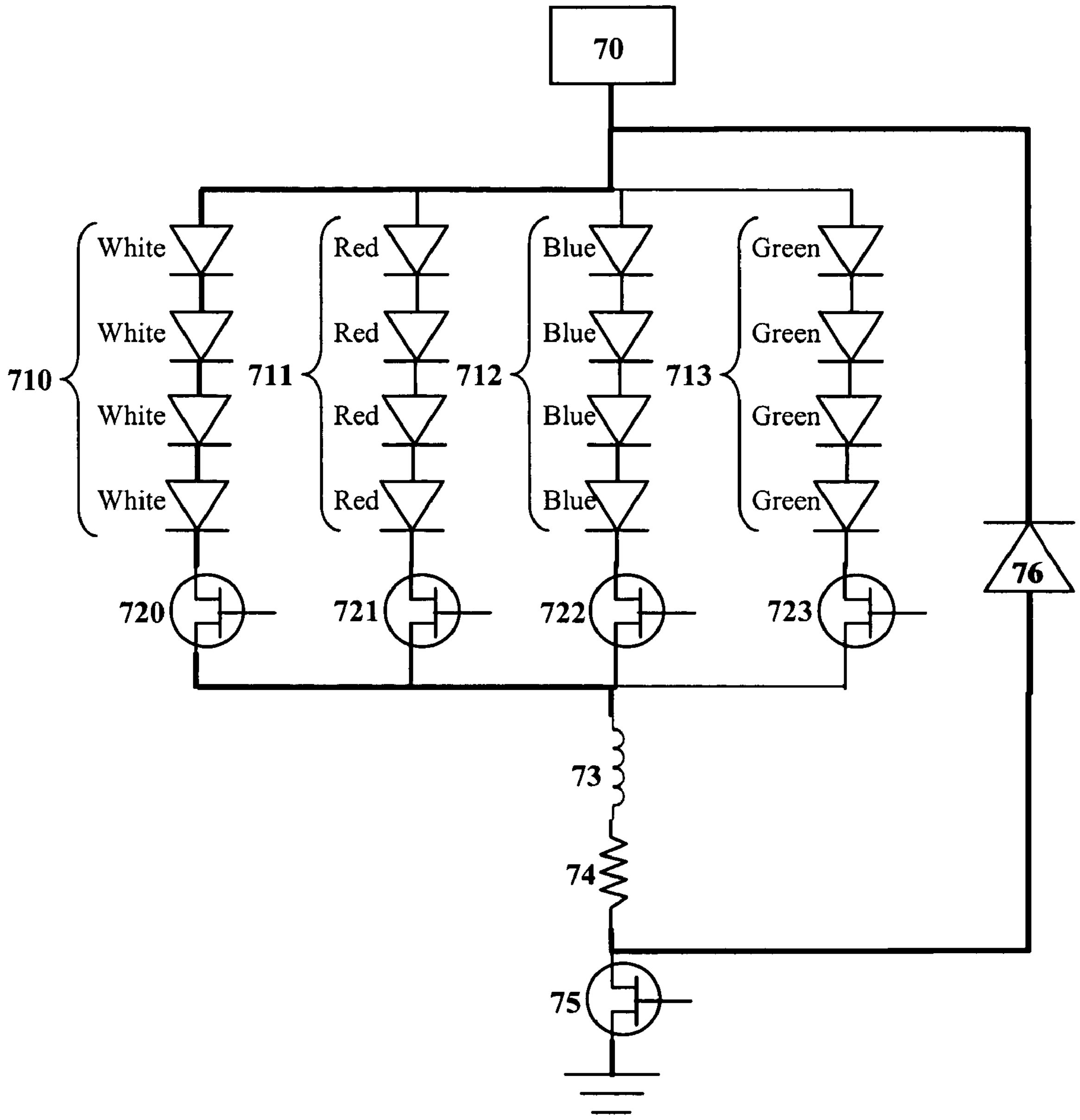
FIG. 9 illustrates a parallel circuit configuration comprising white LEDs, and coloured LEDs for colour compensation, according to one embodiment of the present invention.

In another embodiment of the present invention as illustrated in FIG. 9, LED strings 711 to 713 comprising individually coloured LEDs are placed in parallel with the LED string 710 in the primary path (illustrated with a thick line in FIG. 9) and powered by a power source 70. As shown, a red LED string 711, blue LED string 712, and green LED string 713 are placed in parallel with a white LED string 710, with the current flow through each string controlled by transistor 721, 722, 723, and 720, respectively. During typical operation, most of the current will flow through white LED string 710 with small amounts redirected through parallel LED strings 711, 712 and/or 713 to provide colour correction.

Transistors 720 to 723 are typically operated such that they are complementary to each other, that is, the sum of their duty cycles totals about 100%. The current is thus shifted from white LED string 710 to LED strings of other colours as desired with these colours contributing to the overall CCT of the emitted light from the LEDs. Thus, in this embodiment, the circuit can provide full colour control where any given colour can be fully turned on while the others are fully turned off. Transistors 720 to 723 may also however be operated such that the drive current flows simultaneously through multiple paths if desired.

Inductor 73, resistor 74 and diode 76 form part of the current control circuitry and are used to smooth the current drawn from power source 70 if required. The control signal for the LEDs can be provided via transistor 75 and can be any control signal known in the art, for example, a PWM signal, PCM signal, or any other signal, as would be readily understood by a worker skilled in the art.

According to alternate embodiments of the present invention, the diode and feedback path shown in each of FIGS. 6, 7 and 8 may similarly be omitted.

In another embodiment of the present invention, inductive coupling may be used in the current control circuitry instead of a resistor as in the embodiments of FIG. 6, FIG. 7, FIG. 8 and FIG. 9. This can further reduce power losses and increase efficiency. However, the size of the inductor can be larger than a functionally equivalent resistor.

According to the present invention the phase of the switching waveforms for controlling the light-emitting elements enabling CCT or colour correction can be dynamically adjusted to balance current consumption throughout the full switching period. The overall effect of this form of dynamic adjustment can be increased efficiency and a reduction in the drive components by reducing the need for excessive filtering and smoothing.

In one embodiment, during operation at rated power of the light-emitting elements, avalanching and excessive junction temperatures in light-emitting elements may be reduced. For example, some of the drive current can be redirected from the primary light-emitting elements to secondary light-emitting elements thus allowing the primary light-elements to run at a cooler temperature. In one embodiment, this redirection of current can be configured in a manner that the overall colour temperature or colour of light does not change.

In one embodiment, the apparatus and method of the present invention can be used to correct for long-term lumen depreciation and possible colour shifts of the primary light-emitting elements due to aging and thermal degradation of the package and the light-emitting elements themselves.

As would be readily understood by a worker skilled in the art, LEDs as defined in the various embodiments presented can be replaced with other types of light-emitting elements. In addition, it would be readily understood that the colour of the light-emitting elements, the number of light-emitting elements per string, the number of light-emitting element strings, and the configuration of the circuits may be varied to achieve various desired effects.

The embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An apparatus for correcting colour of light emitted from light-emitting elements, comprising:

a) a power source operatively coupled to a plurality of primary light-emitting elements and to at least one secondary light-emitting element, the power source being configured to provide current to the primary light-emitting elements and to the at least one secondary light-emitting element, each of the primary light-emitting elements being configured to emit light of a particular colour when activated, each of the at least one secondary light-emitting element being configured to emit light of another colour when activated;

b) a primary current path comprising a path through the primary light-emitting elements;

c) at least one secondary current path, each secondary current path comprising a path through at least one of the at least one secondary light-emitting element; and d) a plurality of control means, each of the control means being operatively positioned between the power source and at least one of the primary current path and the at least one secondary current path, the plurality of control means being configured to direct the current principally through the primary current path and selectively through the at least one secondary path, to thereby correct the colour of the light emitted by the primary light-emitting elements, wherein emitted light from the primary light-emitting elements and the at least one secondary light-emitting element is mixed to generate light having a corrected colour corresponding to at least one of a desired colour temperature and a desired colour of light.

2. The apparatus according to claim 1, wherein the power source is configured to supply current to only one of the primary current path and the at least one secondary current path at a given time.

3. The apparatus according to claim 1, wherein the power source is configured to supply current to two or more current paths simultaneously, the two or more current paths comprising the primary current path and the at least one secondary current path.

4. The apparatus according to claim 1, wherein the primary current path and the at least one secondary current path are in a parallel configuration.

5. The apparatus according to claim 1, wherein to primary current path and the at least one secondary current path paths are configured in a series/parallel configuration.

6. The apparatus according to claim 1, wherein the primary light-emitting elements comprise a plurality of white light producing light-emitting elements.

7. The apparatus according to claim 1, wherein the primary light-emitting elements comprise at least one red light-emitting element, at least one green light-emitting element and at least one blue light-emitting element.

8. The apparatus according to claim 1, wherein the apparatus comprises at least three secondary light-emitting elements, the at least three secondary light-emitting elements comprising at least one red light-emitting element, at least one green light-emitting element, and at least one blue light-emitting element, and wherein the apparatus comprises at least three secondary current paths, a first of the secondary current paths comprising a path through the at least one red light-emitting element, a second of the secondary current paths comprising a path through the at least one green light-emitting element, and a third of the secondary current paths comprising a path through the at least one blue light-emitting element.

9. The apparatus according to claim 1, wherein the apparatus comprises at least four secondary light-emitting elements, the four secondary light-emitting elements comprising at least one red light-emitting element at least one green light-emitting element, and at least one blue light-emitting element, and at least one amber light-emitting element, and wherein the apparatus comprises at least four secondary current pats, a first of the secondary current paths comprising a path through the at least one red light-emitting element, a second of the secondary current paths comprising a path through the at least one green light-emitting element, a third of the secondary current paths comprising a path through the at least one blue light-emitting element, and a fourth of the secondary current paths comprising a path through the at least one amber light-emitting element.

10. The apparatus according to claim 1, further comprising a smoothing means operatively coupled to the primary current path and at least one of the at least one secondary path, said smoothing means being configured to smooth one or more switching transients.

11. The apparatus according to claim 10, wherein the smoothing means comprises an inductor.

12. The apparatus according to claim 11, wherein the smoothing means further comprises a resistor.

13. The apparatus according to claim 12, wherein the smoothing means further comprises a free-wheeling diode configured as a return path between a low-side and a high-side of the primary and secondary light-emitting elements.

14. The apparatus according to claim 1, wherein voltage drop across each of the primary current path and the at least one secondary path is about equal.

15. The apparatus according to claim 1, wherein the control means are digitally controlled using at least one switching waveform, each switching waveform having a phase.

16. The apparatus according to claim 15, wherein the phase of each of the at least one switching waveform is dynamically adjusted to balance current consumption over a switching period.

17. A method for correcting colour of light emitted from light-emitting elements, comprising the steps of:

a) generating a current to activate at least one primary light-emitting element and at least one secondary light-emitting element, each primary light-emitting element being configured to emit light of a particular colour when activated, each secondary light-emitting element being configured to emit light of another particular colour when activated;

b) correcting colour of light emitted by the primary light-emitting elements by using a plurality of control means to direct the current principally through a primary path and selectively through at least one secondary path, thereby principally activating at least one primary light-emitting element selectively activating the at least one secondary light-emitting element, the primary path comprising a path through the at least one primary light-emitting element, the secondary path comprising a path through the at least one secondary light-emitting element; and c) mixing the light emitted by the at least one primary light-emitting element with the light emitted by the at least one secondary light-emitting element to generate light having a corrected colour corresponding to at least one of a desired colour temperature and a desired colour of light.

18. The method according to claim 17, wherein the step of providing colour correction comprises the step of directing current to only one of the primary path and the at least one secondary path at a given time.

19. The method according to claim 17, wherein the step of providing colour correction comprises the step of directing current to two or more paths simultaneously, the paths comprising the primary path and the at least one secondary paths.

* * * * *